T. E. MURRAY & H. R. WOODROW.
ELECTRIC WELDING MACHINE.
APPLICATION FILED FEB. 19, 1917.

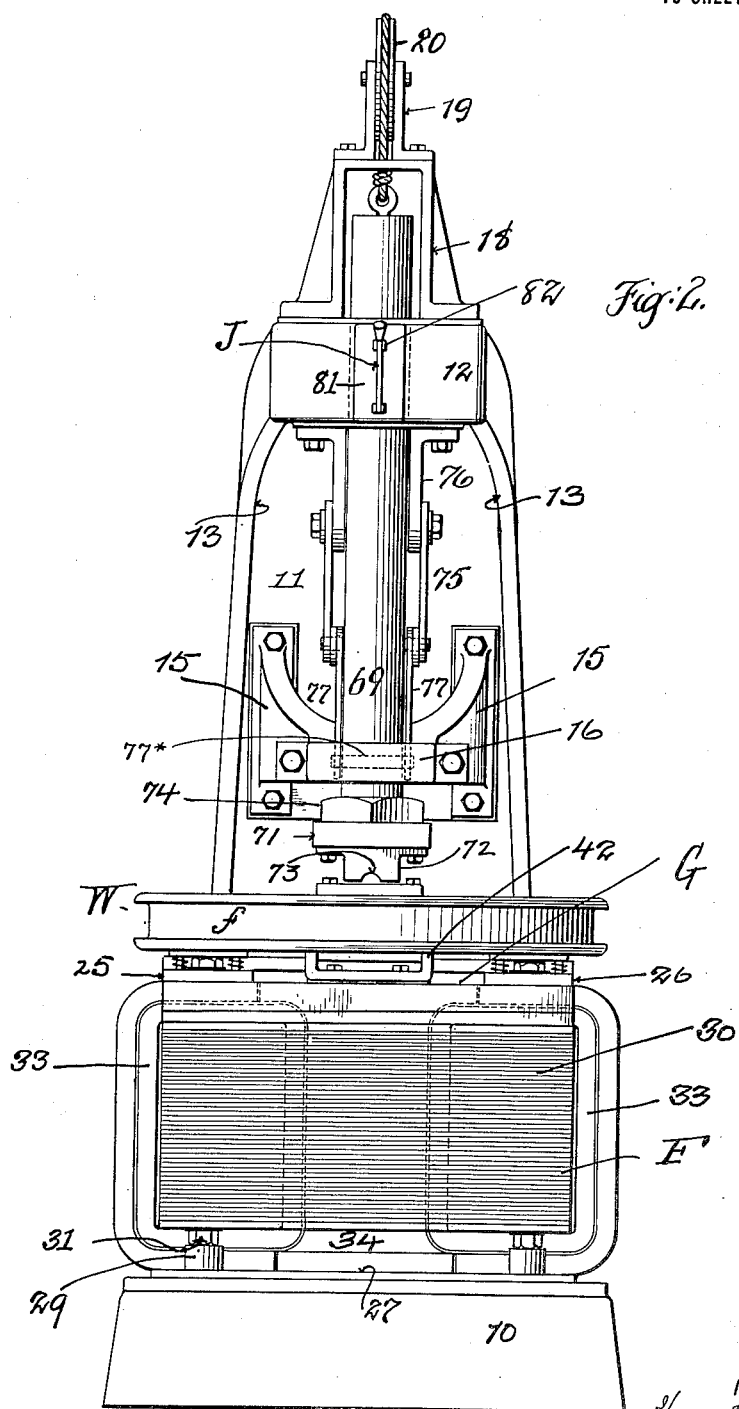

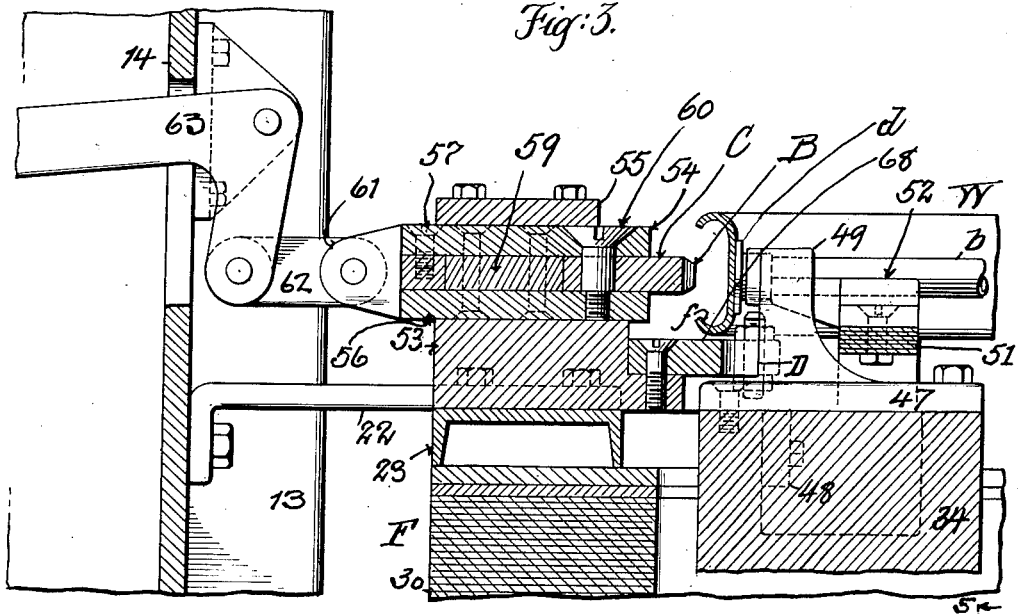
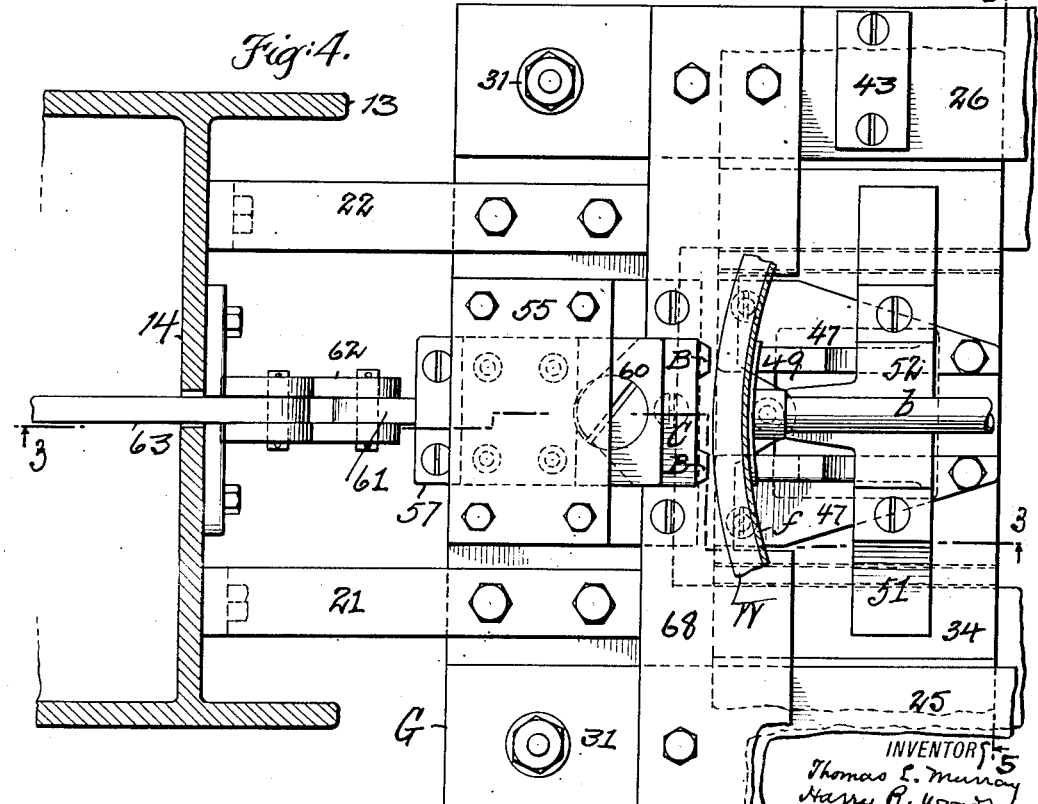

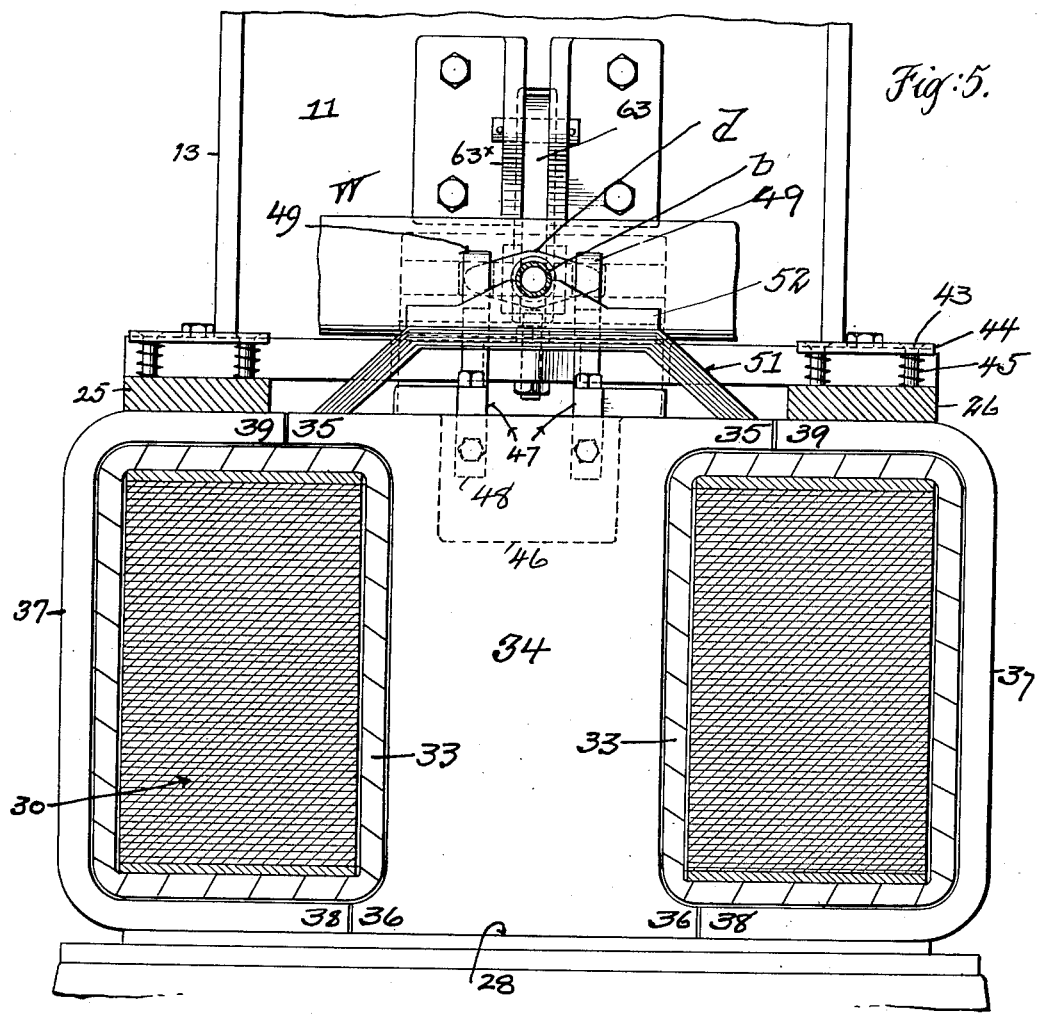
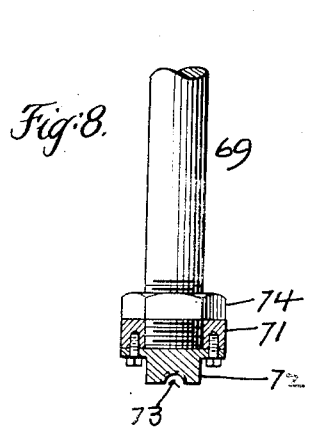
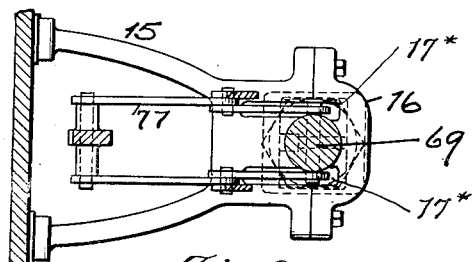

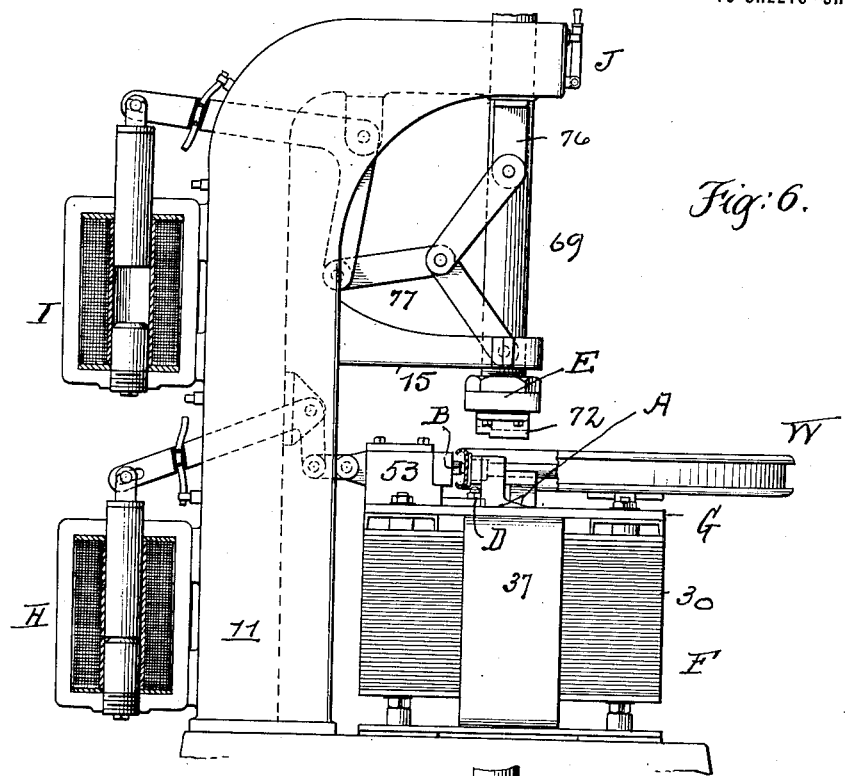
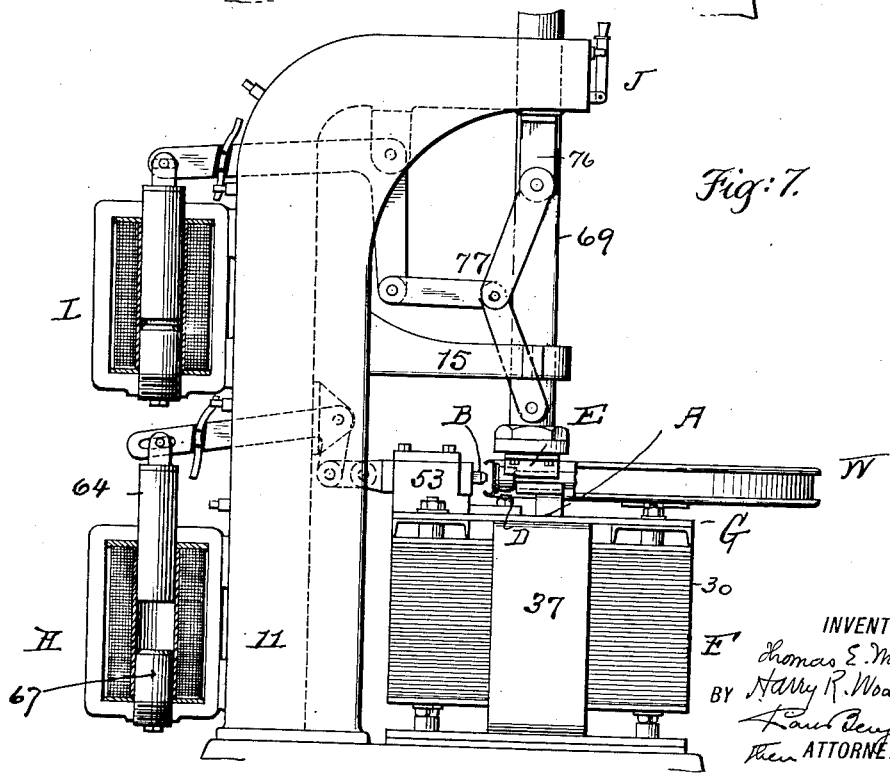

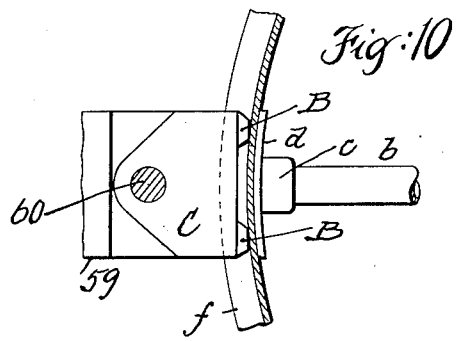
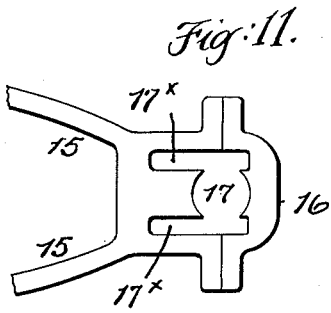
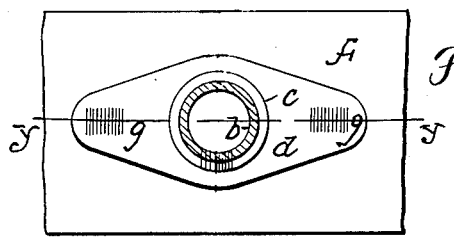
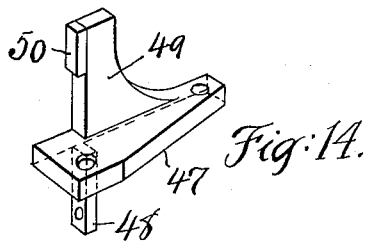
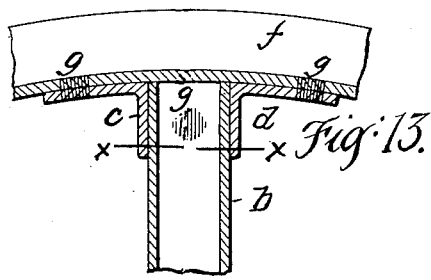
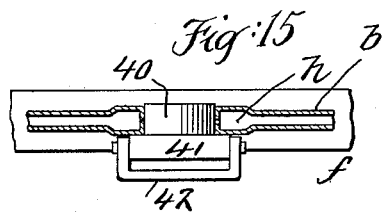
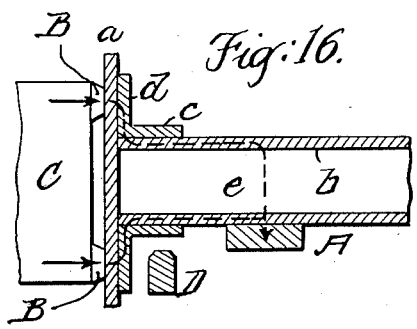
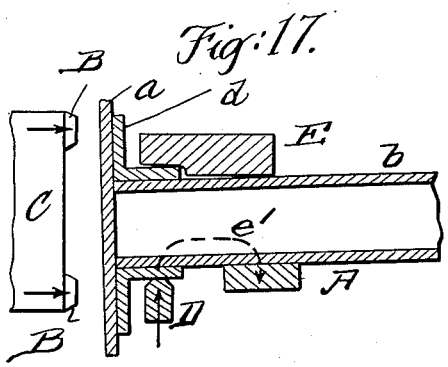

1,252,143.

Patented Jan. 1, 1918.
15 SHEETS—SHEET 7.

INVENTORS
Thomas E. Murray
Harry R. Woodrow
BY
Park Benjamin
Their ATTORNEY

T. E. MURRAY & H. R. WOODROW.
ELECTRIC WELDING MACHINE.
APPLICATION FILED FEB. 19, 1917.

1,252,143.

Patented Jan. 1, 1918.
15 SHEETS—SHEET 12.

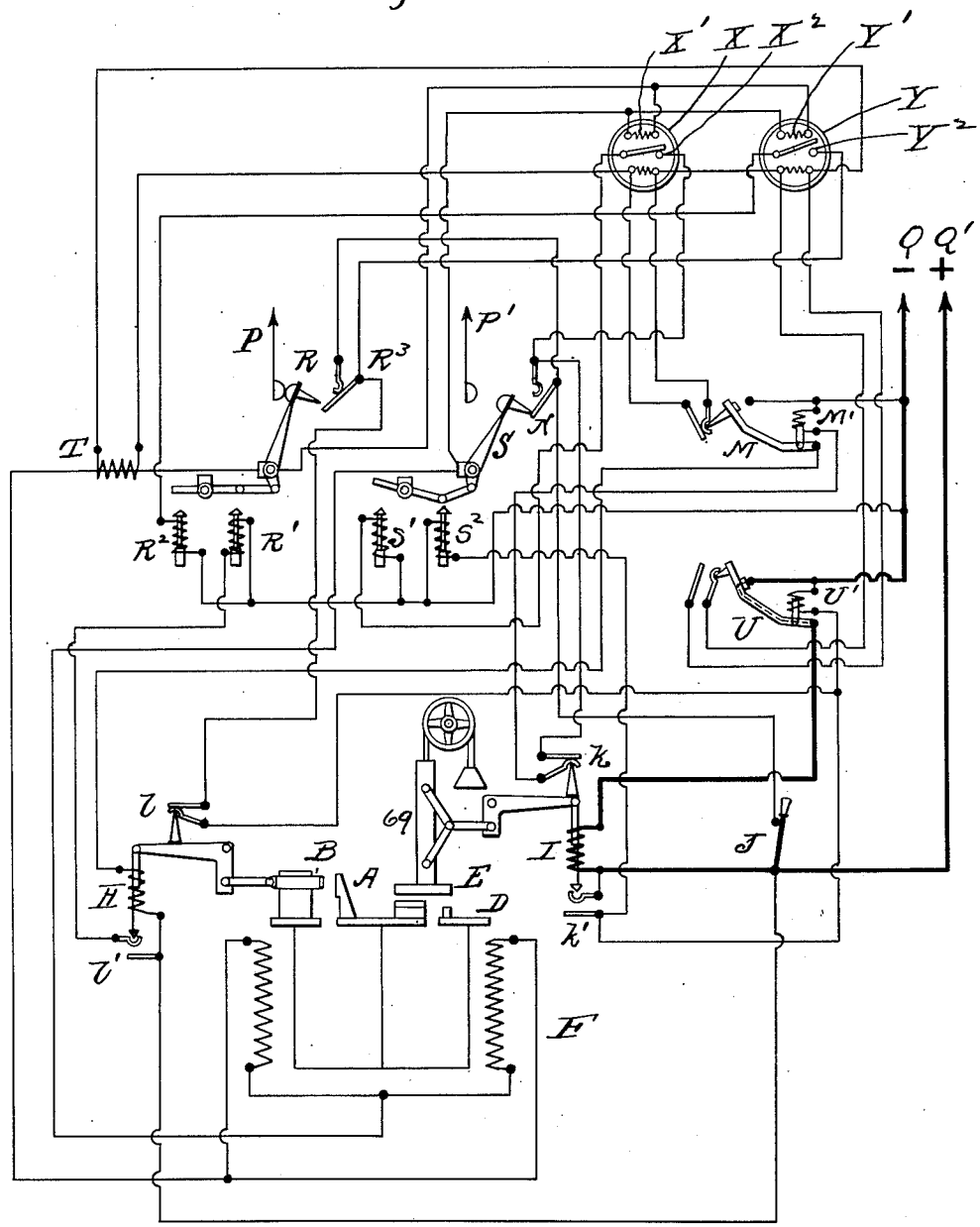

T. E. MURRAY & H. R. WOODROW.
ELECTRIC WELDING MACHINE.
APPLICATION FILED FEB. 19, 1917.
1,252,143.
Patented Jan. 1, 1918.
15 SHEETS—SHEET 14.
Fig: 25.
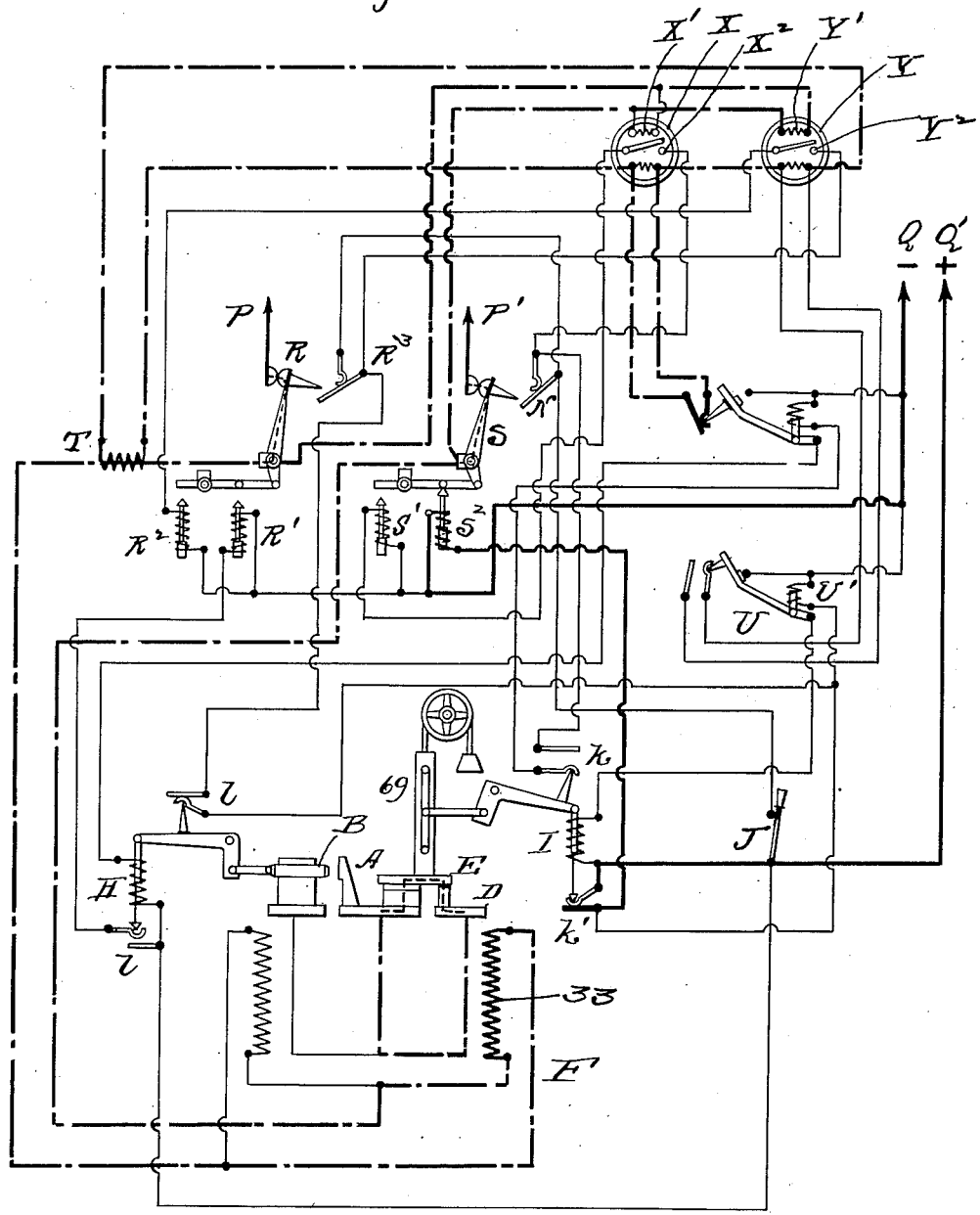
INVENTORS
Thomas E. Murray
Harry R. Woodrow
BY
Their ATTORNEY T. E. MURRAY & H. R. WOODROW.
ELECTRIC WELDING MACHINE.
APPLICATION FILED FEB. 19, 1917.
1,252,143.
Patented Jan. 1, 1918.
15 SHEETS—SHEET 15.
Fig: 26.
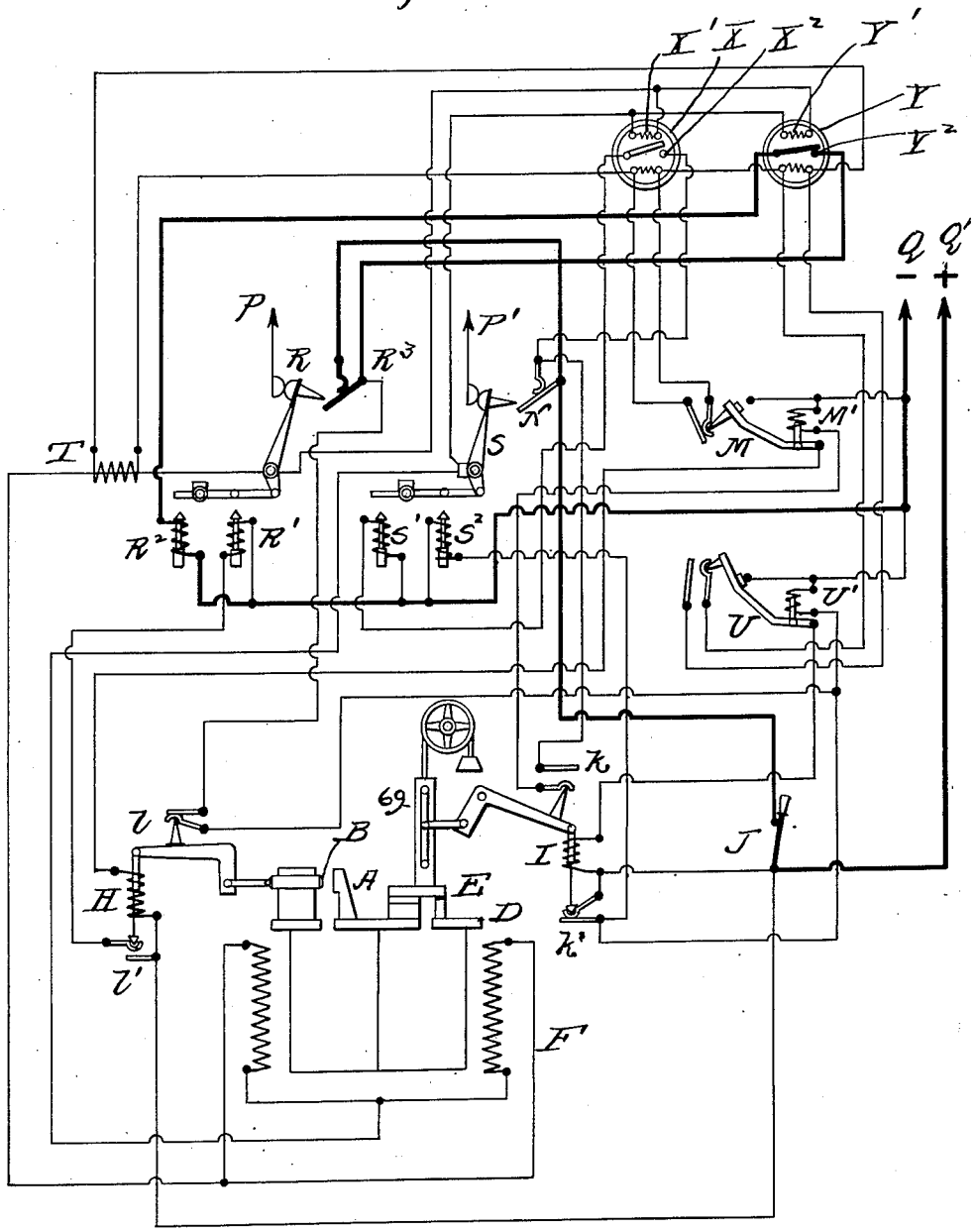
INVENTORS
Thomas E. Murray
Harry R. Woodrow
BY
ATTORNEY

UNITED STATES PATENT OFFICE.

THOMAS E. MURRAY AND HARRY R. WOODROW, OF NEW YORK, N. Y.; SAID WOODROW ASSIGNOR TO SAID MURRAY.

ELECTRIC WELDING-MACHINE.

1,252,143.  Specification of Letters Patent.  Patented Jan. 1, 1918.

Application filed February 19, 1917. Serial No. 149,499.

*To all whom it may concern:*

Be it known that we, THOMAS E. MURRAY and HARRY R. WOODROW, citizens of the United States, residing at New York, in the county of New York and State of New York, have invented a certain new and useful Improvement in Electric Welding-Machines, of which the following is a specification.

The invention is an electric welding machine organized to weld in succession a plurality of joints between the bodies to be united.

After a master switch is closed, the operation of the machine is automatic.

The machine is here shown constructed to weld a wheel rim to the flanges of ferrules carried on the spokes, and to weld said ferrules to said spokes.

In U. S. Patent No. 1,187,543, granted to us June 20, 1916, we have set forth an electric welding machine for uniting together the half sections of a hub of sheet metal, such as appears in the wheel here shown, and in U. S. Patent No. 1,180,096, granted to us April 18, 1916, we have set forth an electric welding machine for uniting the hollow spokes to said hub. The present machine, therefore, completes the wheel by the uniting of the rim to the spokes. We have built and are now practically using commercially all three of these machines, and we electrically weld together, as above described, the parts of the homogeneous sheet metal wheel in a period of one minute and forty-five seconds, which includes the time of adjusting said parts in the several machines.

In the accompanying drawings—

Figure 1:
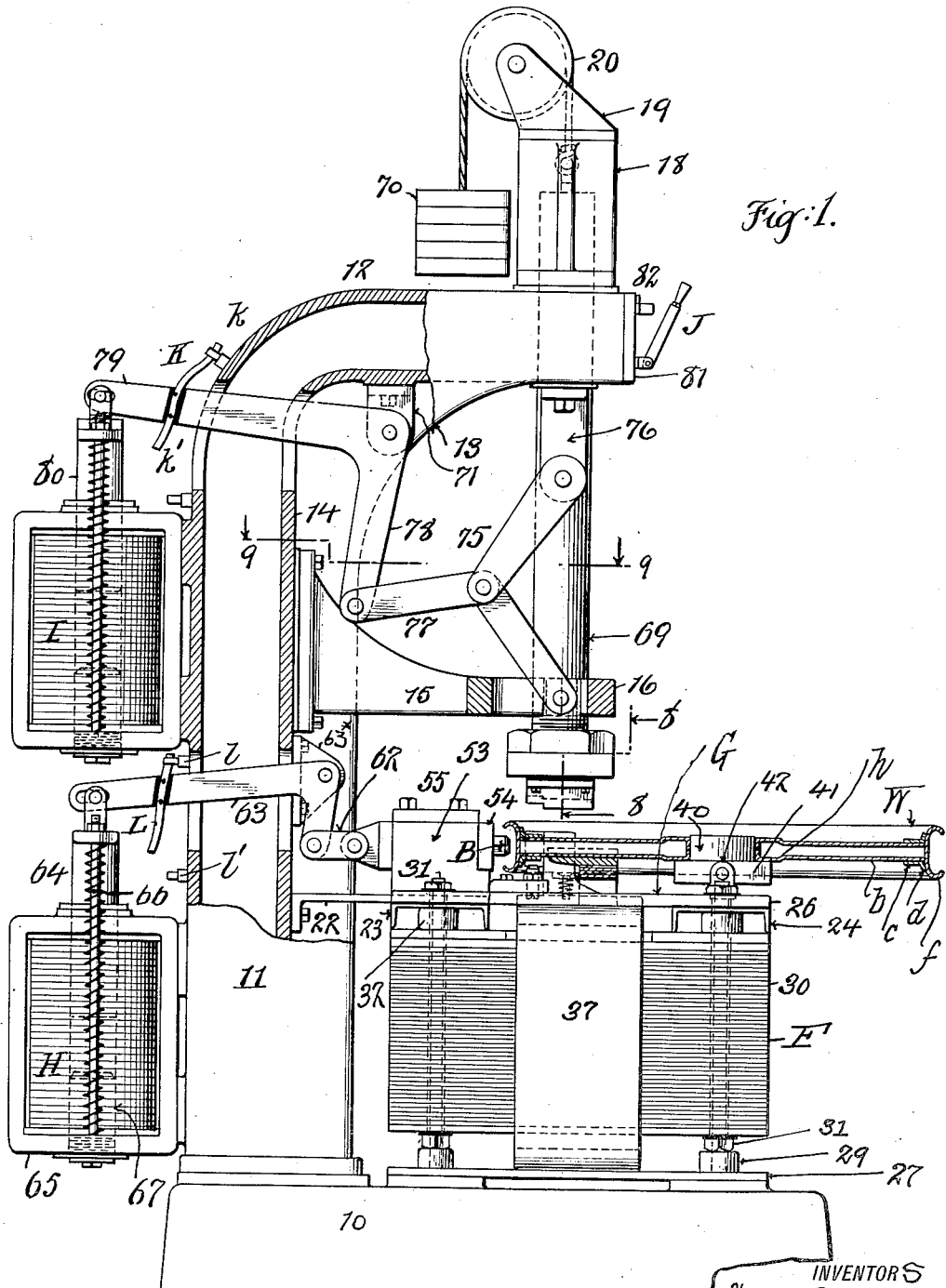

Figure 1 is a side elevation of the machine with certain parts shown in vertical section. Fig. 2 is a front elevation of the machine. Fig. 3 is an enlarged vertical section of the mechanism for welding the rim to the ferrule flanges, on the line 3, 3 of Fig. 4. Fig. 4 is a plan view of the same, showing the wheel, except the spoke, rim and ferrule to be welded, broken away, and the remaining portion of the rim and the standard 11 in horizontal section. Fig. 5 is a vertical section on the line 5, 5 of Fig. 4. Figs. 6 and 7 are side elevations, showing respectively the pressing mechanism in raised position and in lowered position just before the wheel is tilted. Fig. 8 is a detailed elevation of the lower end of the presser rod 69—the ring 71 and the presser block 72 being in section—on the line 8, 8 of Fig. 1. Fig. 9 is a section on the line 9, 9 of Fig. 1. Fig. 10 is a plan view of a portion of the wheel rim, a spoke and ferrule, and of the electrodes B, B with their pivoted carrier C and its supporting block 59—the rim and pivot pin 60 being in section. Fig. 11 is a plan view of the end of the two-armed bracket 15 and cap 16, showing the shape of the opening 17 in said bracket and cap. Fig. 12 shows the ferrule and flange and the inner surface of the rim, taken in section on the line $x$, $x$ of Fig. 13. Fig. 13 is a section on the line $y$, $y$ of Fig. 12. Fig. 14 is a perspective view of the plate 47 with its projections 48 and 49. Fig. 15 is a diametral section of the wheel hub and a portion of two of the spokes, mounted on the support 40 shown in elevation. Figs. 16 and 17 are illustrative figures designed to facilitate the description of the two welding operations performed by the machine. Figs. 18 to 26, inclusive, are electrical diagrams, symbolically showing the circuits and changes therein occurring during the operation of the machine.

Similar letters and numbers of reference indicate like parts.

For convenience in reaching a ready understanding of the welding operation which this machine performs, we will first refer to Figs. 16 and 17—it being understood that said figures are merely illustrative, and not intended to exhibit the specific construction of the machine hereinafter explained in detail.

Let $a$ be a metal plate, $b$ a tube, and $c$ a ferrule on said tube. The operations are: (1) the flange $d$ on the ferrule $c$ is to be welded to the plate $a$, and (2) the tubular portion of the ferrule $c$ is to be welded to the tube $b$. In Fig. 16, let A be an electrode, and B, B a pair of electrodes of like polarity mounted on the movable carrier C. Then if the tube $b$ be held in any suitable manner, and the carrier C be moved to press the electrodes B, B against plate $a$, the welding current will pass, as indicated by the arrow *e*, and the flange *d* will be welded to the plate *a* at two points.

Note that a fixed electrode D in Fig. 16 is disposed below the ferrule *c*.

In Fig. 17, the welds having been made as above described, the support C is retracted. A pressing device, indicated at E, descends upon the tube *b*, and tilts said tube downwardly to establish contact between the ferrule *c* and electrode D. Welding current then passes between electrode D and electrode A, as indicated by arrow *e'*, and produces the weld between ferrule *c* and tube *b*.

By suitable mechanism electrically controlled, these operations follow automatically and successively upon the closing of a single master switch.

The frame.

On the base 10, Fig. 1, is a hollow standard 11, having a horizontal arm 12, supported by side webs 13. On the front wall 14 of said standard is a two-armed horizontal bracket 15 (Figs. 9 and 11), on which is a cap 16. In the cap and the bracket are formed recesses which produce an opening 17, Fig. 11, of approximately U-shape.

Secured on standard arm 12 is a three-sided frame 18 having on its side members, flanges which may be electrically welded to the top member of said frame. On said frame are bolted two rearwardly inclined brackets 19, in which is journaled the pulley 20.

21 and 22, Figs. 1 and 4, are horizontal arms having flanges bolted to the front wall of standard 11. These arms carry a quadrangular frame, generally indicated at G (and hereafter, for brevity, designated by that letter), and composed of a channel-shaped bar 23 bolted to said arms, a channel-shaped bar 24 parallel to bar 23, and two parallel flat side bars 25, 26 which are bolted upon bars 23, 24. This frame is directly above the transformer, which is generally indicated at F.

The transformer.

On base 10 are projections 27, Fig. 1, upon which rests a copper plate 28, Fig. 5, having upwardly projecting lugs 29. 30 is the laminated core of the transformer, here a quadrangular frame. Four bolts 31 (two shown in Fig. 4) extend down through the corners of frame G and lugs 32 on the under side of channeled bars 23, 24 (Fig. 1). Said bolts pass through the core 30, and at their lower ends enter lugs 29. Said bolts are threaded to receive nuts above frame G, and also above lugs 29. The primary coil 33 of the transformer incloses the core 30 in the usual way.

The secondary, best shown in Fig. 5, is in three parts, namely—a middle member 34, having lateral projections 35, 36 at top and bottom, and two U-shaped side members 37. The member 34 and the lower arms 38 of said side members 37 rest upon copper plate 28. There are gaps between upper arms 39 of said side members and the top projections 35 of middle member 34.

The object to be welded.

The machine is designed to weld the flange of a spoke ferrule to a vehicle wheel rim, and also to weld the body of the ferrule to the spoke. The specific vehicle wheel treated in the present machine is of sheet metal, and shown in diametral section at W in Fig. 1, and in edge elevation in Fig. 2. The spokes *b* are tubular, Figs. 12, 13. The rim *f* has the usual turned out edges. The flange *d* on ferrule *c* is preferably of the shape shown in Fig. 12, and the welds produced in the manner already described in connection with Figs. 16, 17, are in Figs. 12, 13 indicated by the shaded spots at *g*.

The wheel has a hollow hub *h*, Fig. 15, with the usual central opening which receives a cylindrical boss 40, Figs. 1 and 15, on a plate 41 which is pivoted between the upturned ends of a bar 42 bolted on channel bar 24 of frame G, Fig. 2. By reason of this pivoted central support, the wheel may be tilted, for the purpose already described in connection with Fig. 17. In order to support the wheel rim and at the same time permit this inclination, we provide on each of the side bars 25, 26 two headed pins 43, Figs. 4 and 5, loose upon which are rectangular plates 44 of insulating material supported by helical springs 45.

The mechanism for welding the ferrule flange to the rim.

In the middle member 34 of the transformer secondary is a recess 46, Figs. 3 and 5. Above this recess, lapping over the same and resting on said member are two plates 47. One of these plates is shown in perspective in Fig. 14. Integral with each plate and depending therefrom is a short bar 48 which enters said recess and is bolted to member 34. Also integral with said plate and extending upwardly is an arm 49, having on the upper portion of its rear face a wearing plate 50. The two arms 49 receive between them the spoke *b* when the wheel is in place, as shown in Figs. 3 and 4, and provide fixed abutments against which the flange *d* is pressed by the horizontally moving electrodes B, B. Coöperating with the electrodes B, B, which will be described farther on, is the fixed electrode, generally designated as A, which is constructed as follows:

Resting upon the upper surface of the middle secondary member 34 are the downwardly inclined ends of a brush 51 of copper laminations, Fig. 5. On the horizontal middle portion of said brush is mounted a plate 52, in which is a groove which receives the spoke b. Because the plate 52 is supported by the resilient brush 51, said plate yields downwardly when the wheel is tilted, as described in connection with Fig. 17.

It will, of course, be understood that the arms 49 hitherto described as abutments, and the plate 52 which supports the spoke, may both be regarded as electrodes of like polarity, since both are electrically connected to the secondary member 34. But for the sake of clearness and of keeping the specific construction of the machine in accordance with the illustrative drawings Figs. 16, 17, and also, and more especially, because the plate 52 is in fact the coöperating electrode with the fixed electrode D when the joint is made between ferrule and spoke, as shown in Fig. 17, we here designate the plate 52 as the electrode A electrically coöperating with the movable electrodes B, B, which we now proceed to describe.

On channeled bar 23 of frame G is a block 53, Fig. 1, shown also in section in Fig. 3. A horizontally sliding carriage 54 is disposed in a transverse recess in said block, said recess having a cover plate 55. The sliding carriage 54 is made up of a lower plate 56 and an upper plate 57, between which are the spacing blocks 58, 59 and the carrier C for the electrodes B, B. The front vertical face of spacing block 59 is flat—see Fig. 10. The carrier C is substantially V-shaped on its rear edge, the angle of the V being rounded and bearing against said block. A pivot pin 60, Fig. 3, extends through the upper plate 57 and carrier C, and is secured in place by a threaded extension entering lower plate 56. The electrodes B, B, as shown in Fig. 10, meet the wheel rim on opposite sides of the spoke, and during the welding operation cause the current to pass to the opposite electrode A. The object of pivoting carrier C in the sliding carriage 54 is to enable the electrodes B, B to adjust themselves with respect to the rim surface, so that they will exert equal pressure at the joints, when forced into contact with said surface by the mechanism now to be explained.

On the rear of carriage 54 is a lug 61, Fig. 1, which is connected by a double link 62 to the short arm of the bell crank lever 63, which is pivoted in a bracket 63* on the front of standard 11. The long arm of said lever extends through openings in said standard, and has at its end a longitudinal slot which receives a pin on the upper end of the plunger core 64 of an electro-magnet H, the supporting frame 65 of which is secured to said standard. Vertical rods 66 secured in lateral offsets of the lower member of said frame extend upwardly through similar offsets on the core 64, and are provided with nuts above said last-named offsets. Helical springs surrounding said rods, normally hold said core in elevated position, as shown in Fig. 1, and when said core is thus elevated, it will be obvious that the electrodes B, B are retracted.

Within the lower portion of magnet H is a short core 67, Figs. 6 and 7, threaded so as to be adjustable in a threaded opening in frame 65. The object of making the core 67 adjustable is to vary the air gap between said core and the plunger core 64, and in this way to introduce more or less reluctance into the magnetic circuit, and so regulate the pressure exerted by the electrodes B, B. When the magnet H is energized, it draws down its plunger core 64, and through the mechanism described, forces the electrodes B, B against the wheel rim.

*The mechanism for welding the ferrule to the spoke.*

On the front side of the block 53, Figs 3 and 4, is a ledge, to which is secured a plate 68, Fig. 3, which extends over and is bolted to the bars 25, 26 of frame G. Said plate has on its front edge a recess, in which is a horizontal projection, through which passes electrode D. Said electrode is a pin, adjustable in said projection, and is held in place as adjusted by a lock nut. As already described in connection with Fig. 17, the wheel is tilted in order to press the ferrule c against the upper face of the electrode pin D.

The downwardly acting presser mechanism, generally indicated at E, Figs. 6, 7, is as follows:

A vertical rod 69 passes through opening 17 in bracket 15 and through standard arm 12, and is suspended by a cord passing over the pulley 20 and carrying a counter-weight 70. The lower end of the rod 69 is threaded, as shown in Fig. 8, to receive a ring 71, which ring carries a block 72, in the lower side of which is a groove 73 which is suitably formed—Figs. 6 and 7—to fit upon the ferrule and upon the spoke. The ring and block are adjustable upon the end of the rod 69, and are clamped in position as adjusted by the lock nut 74.

In order vertically to move the rod 69, we provide a toggle mechanism 75, Figs. 1, 6, 7. The two upper arms of the toggle are pivoted to two depending brackets 76, secured on the under side of standard arm 12. The lower arms of the toggle enter spaces 17*, in bracket 15, Fig. 11, and are pivoted to the rod 69 which is between them. Links 77 connected to the toggle joints are connected by pin 77*, Fig. 2, to which pin is pivoted the short arm 78 of a bell crank lever, which lever at its angle is pivoted to a lug 79 depending from standard arm 12.

The long arm 78 has a longitudinal slot which receives a pin on the upper end of the plunger core 80 of an electro-magnet I. The construction of this magnet and its cores, frame and retracting springs is the same as already described in connection with magnet H. The mechanism being in the position shown in Fig. 6, when magnet I is energized, the rod 69 is forced downward by the action of the toggle mechanism 75, so as to press the groove 73 in block 72 upon the ferrule and spoke of the wheel beneath it. The wheel is thus tilted, as already described in connection with Fig. 17, whereby contact is established between the ferrule $c$ and pin electrode D, so that circuit is now completed from electrode D, through ferrule $c$, and spoke $b$, to the electrode $a$. In practice, the actual tilting of the wheel is at too small an angle to be exhibited in Fig. 7.

The following switches on the machine are now to be noted:

The master switch J, mounted on a plate 81 of insulating material on arm 12, Fig. 1, coöperates with a contact 82 on said plate. A switch bar K of metal is secured upon a plate of insulating material on bell crank lever arm 79, Fig. 1, and, as the lever is moved, coöperates with contacts $k$ and $k'$, supported in blocks of insulating material on the rear side of the standard 11. A similar switch bar L, secured to a plate of insulating material on the side of the long arm of bell crank lever 63, coöperates with contacts $l$ and $l'$, supported by blocks of insulating material, also on the rear side of the standard 11.

*The circuits and automatic operation.*

In Figs. 18 to 26, inclusive, we illustrate the circuits (active circuits in heavy black lines) during the automatic operation of the machine.

The A. C. welding circuit has its terminals at P, P'. The D. C. circuit which operates the mechanism has its terminals at Q, Q'.

In the machine, the welding current for rim and ferrule passes from the side members 37 of the secondary to the bars 25, 26 and plate 23 of frame G, to block 53, sliding carriage 54 and electrodes B, B, through the joint to electrode A and middle member 34 of said secondary.

The welding current for ferrule and spoke passes from the side members 37 of the secondary, to the bars 25, 26 of frame G, to plate 68, electrode D, through the joint to electrode A, to the middle member 34 of said secondary.

Figure 18:
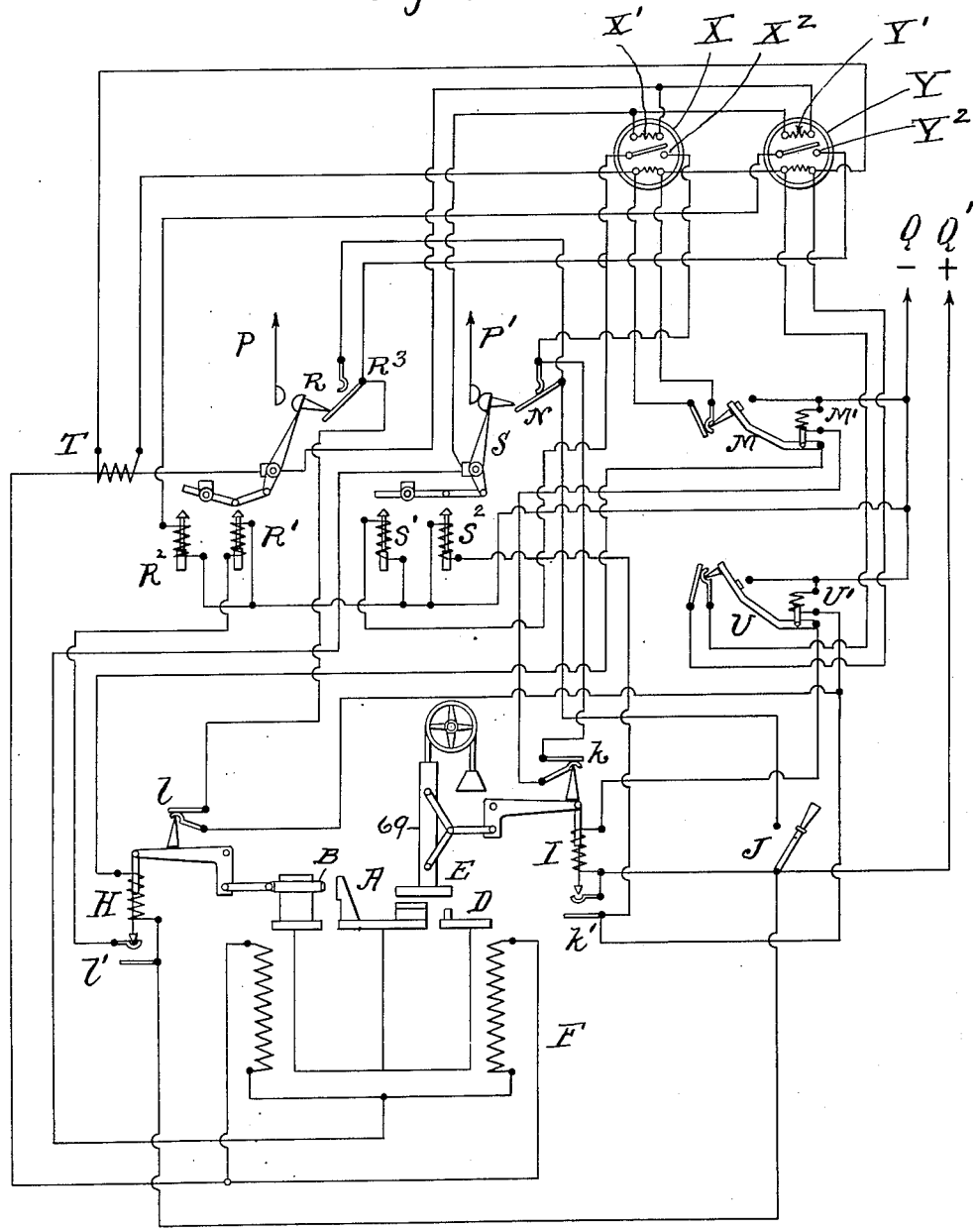
Figure 19:
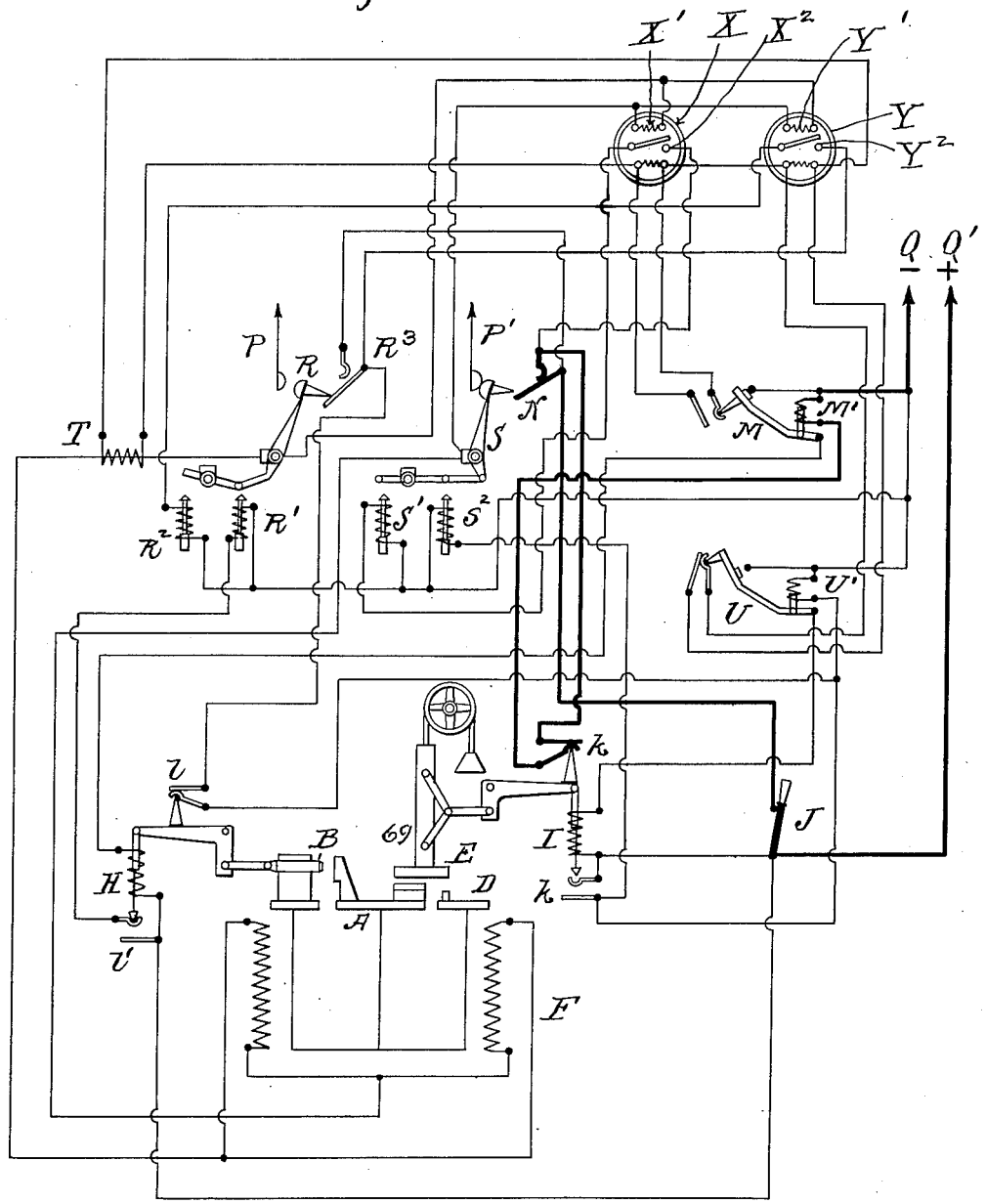

In Fig. 18 the parts are all in position ready to operate. The master switch J is open. The electrodes B, B are retracted. The presser rod 69 is raised. Attention is called to the switch M, which is open. As soon as the switch J is closed, the magnet M' which controls contact switch M is energized, and the circuit condition is shown in Fig. 19. That is to say, the circuit proceeds from the plus D. C. terminal Q', through the switch J, through a spring contact switch at N, through the contact at $k$, through the magnet at M', and so to the minus direct terminal Q.

Figure 20:
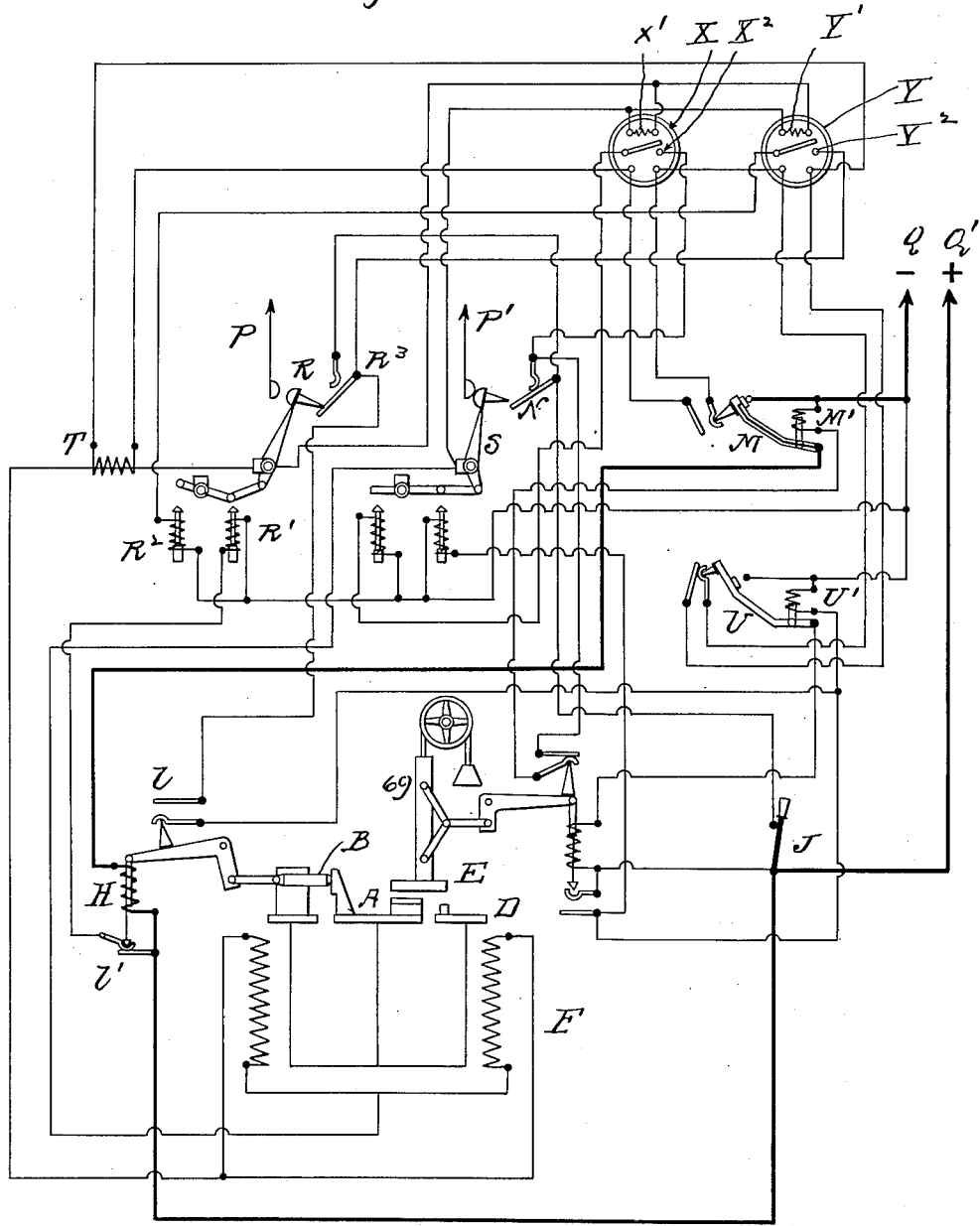

The effect of energizing magnet M', namely, to close relay contact switch M, is shown in Fig. 20. The circuit now proceeds from plus terminal Q', to switch J, through electro-magnet H, through the closed switch M, and so to the negative D. C. terminal Q. The magnet H, through the toggle mechanism, moves electrodes B, B into pressing contact with the wheel rim.

As the core of magnet H descends, circuit is closed at contact $l'$, and hence through magnet coil R'. When coil R' is energized, it throws up its plunger core, which strikes a broken toggle joint connected to switch R, and in straightening said toggle, closes said switch R. Circuit beginning at the A. C. terminal P, now proceeds through closed switch R, to one terminal of primary coil 33, to closed switch S, and to A. C. terminal P'. The welding current then passes.

Figure 21:
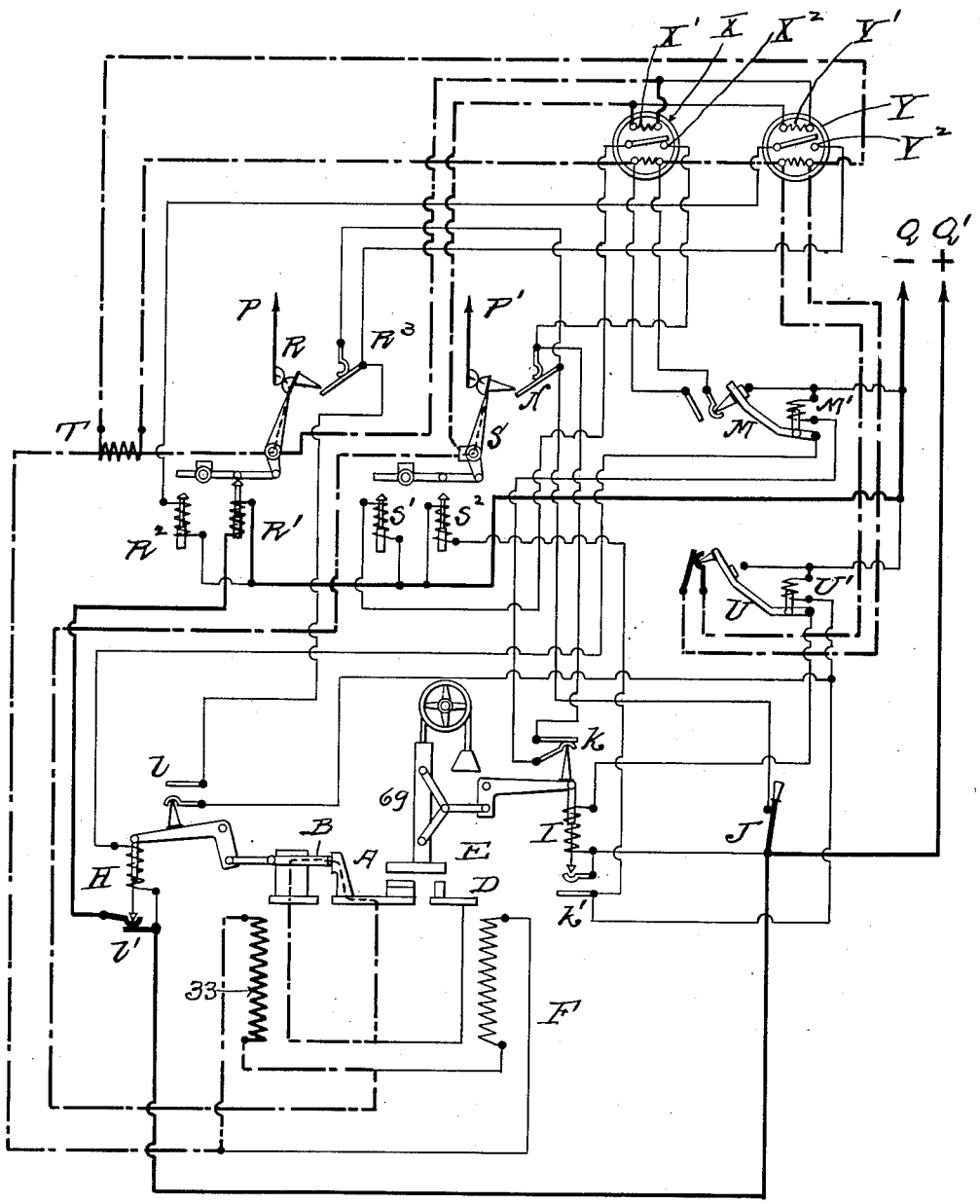

A current transformer T is in series circuit with the two current coils of relay wattmeters X and Y. In shunt with the primary circuit now established is the potential coil X' of wattmeter X. Wattmeter X then rotates its armature to close circuit at $X^2$, as shown in Fig. 21.

Figure 22:
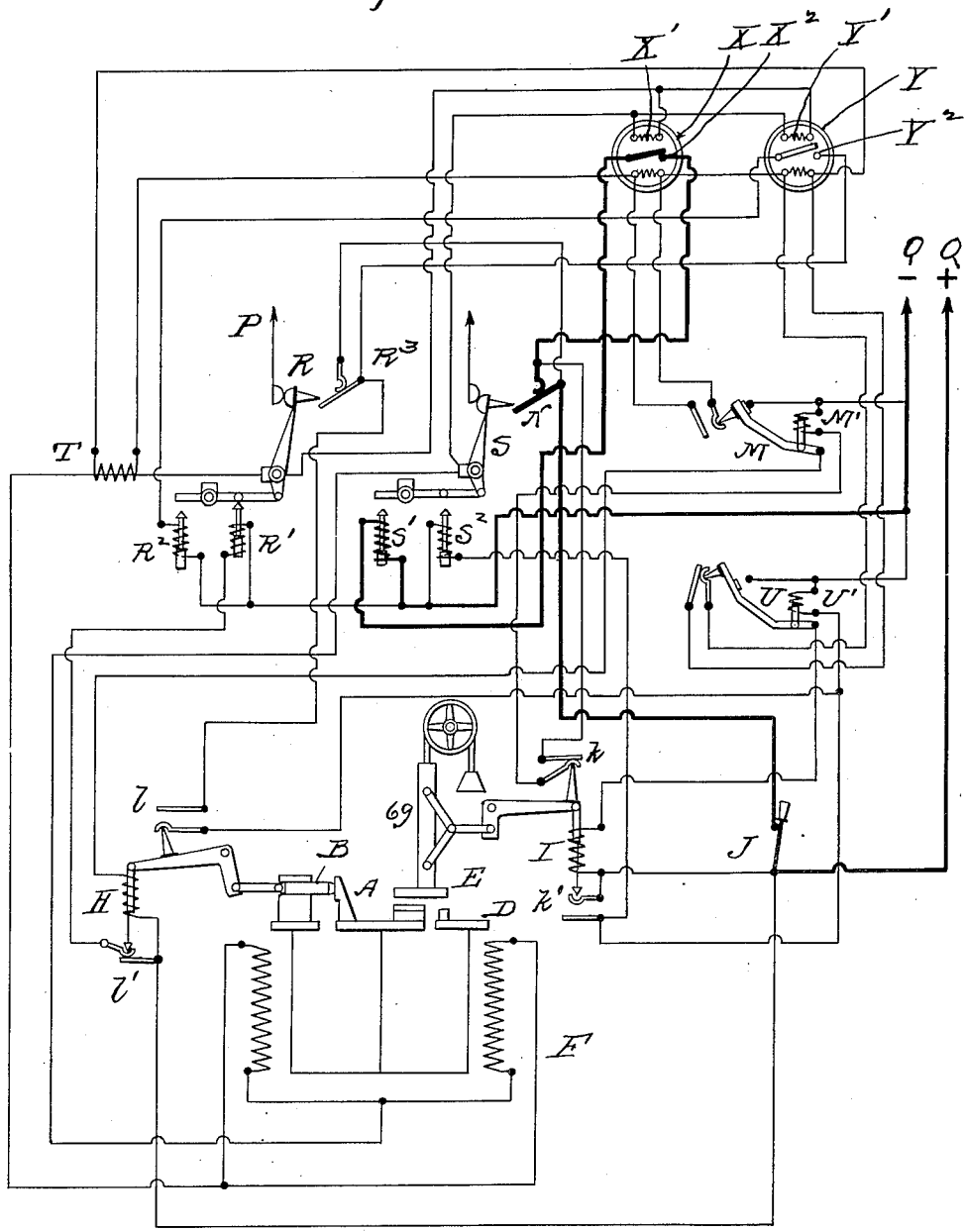

The result appears in Fig. 22.

Figure 23:
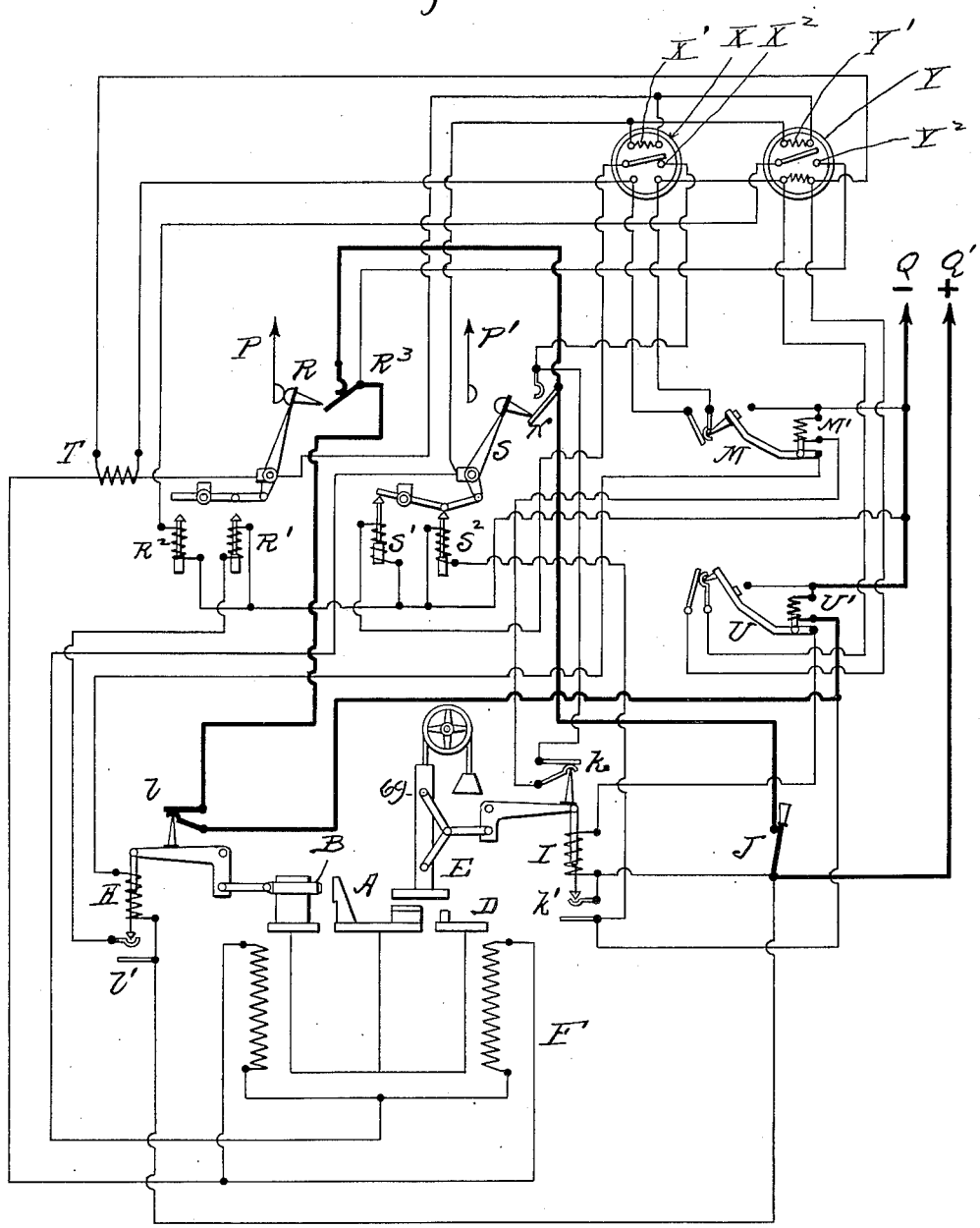

The closing of wattmeter X establishes direct current through the coil S' of switch S. The plunger core of said coil rises, breaks the toggle and opens switch S, as shown in Fig. 23. This cuts off the welding current. The spring 66 in magnet H pushes up the core so as to establish contact at $l$, and retracts electrodes B, B. The resulting circuit (see Fig. 23) is then from D. C. terminal Q', through the master switch J, to closed spring contacts at $R^2$, to contact $l$, to the magnet U', which controls switch U, and so to negative terminal Q. Switch U (see Fig. 24) closes circuit from plus D. C. terminal Q', through magnet I, to negative D. C. terminal Q.

Magnet I now being energized, draws down rod 69, and at the same time closes circuit at $k'$. The result is shown in Fig. 25. Direct current then proceeds to switch J, to contact $k'$, to coil $S^2$ of switch S, and to negative D. C. terminal Q. Switch S closes. A. C. current then proceeds from A. C. terminal P, to primary transformer coil 33, to switch S and A. C. terminal P'. The welding current passes between electrodes A, D. Shunt circuit from terminals P, P' is established through the potential coil of wattmeter relay Y. Circuit from the current transformer T is established through the current coil of wattmeter Y, through the by-pass afforded by spring contacts $M^2$, so that wattmeter X is not operated. Wattmeter Y rotates its armature to close circuit at $Y^2$.

The result is shown in Fig. 26. Circuit is established from D. C. terminal Q', through switch J, spring contacts $R^3$, wattmeter Y, coil $R^2$ of switch R, and terminal Q. Switch R opens, so breaking the A. C. circuit. All the magnets are deënergized. The counter-weight 70 raises the presser rod 69, and the parts resume their normal position. The switch J is manually opened, and the wheel is readjusted on its support to present new joints to be welded.

It will be obvious from the foregoing that the whole operation of this machine is automatic after the wheel has been put in position and the master switch J closed.

It is to be noted that the pressure exerted by magnet I, through the toggle mechanism and rod 69, is a gradually increasing one, and that the toggle arms are not straightened (Fig. 7) when maximum pressure is exerted at the joint at electrode D.

We claim:

1. An electric welding machine, comprising means for holding a body having joints to be welded, means for establishing a welding current, and automatically operating means for closing welding circuit successively through said joints.

2. An electric welding machine, comprising means for holding bodies having two joints to be welded, the contact surfaces of said joints respectively being in planes disposed at different angles to one another, means for establishing a welding current, and automatically operating means for closing welding circuit successively through said joints.

3. An electric welding machine, comprising means for holding bodies having joints to be welded, a pair of coöperating electrodes for welding two of said bodies, a pair of coöperating electrodes for welding one of said bodies to a third body, means for establishing a welding current, and automatically operating means for closing welding circuit successively through said pairs of electrodes.

4. An electric welding machine, comprising means for holding two bodies to be welded, one of said bodies partly overlapping the other, and two coöperating electrodes in contact with corresponding faces of said overlapping body and said overlapped body; whereby a welded joint is formed between said bodies.

5. An electric welding machine, comprising means for holding two bodies to be welded, one of said bodies partly overlapping the other, two electrodes in proximity to corresponding faces of said overlapping body and said overlapped body, and means for moving said bodies into contact with said electrodes; whereby a welded joint is formed between said bodies.

6. An electric welding machine, comprising means for holding two bodies to be welded, one of said bodies partly overlapping the other, two electrodes in proximity to corresponding faces of said overlapping body and said overlapped body, and a support for said bodies, the said bodies being tiltable on said support to move said faces into contact with said electrodes; whereby a welded joint is formed between said bodies.

7. An electric welding machine, comprising means for holding two bodies in position for welding, one of said bodies partly overlapping the other, a resiliently supported electrode in contact with the face of said overlapped body, a fixed electrode in proximity to the corresponding face of said overlapping body, and means for moving said bodies to carry the face of said overlapping body into contact with said fixed electrodes; whereby a welded joint is formed between said bodies.

8. An electric welding machine, comprising means for holding two bodies in welding position, a fixed electrode in contact with one of said bodies, a support, a sliding carriage on said support, and an electrode on said carriage and movable thereby into contact with the other of said bodies.

9. An electric welding machine, comprising means for holding two bodies in welding position, a fixed electrode in contact with one of said bodies, a support, a sliding carriage on said support, an electrode on said carriage, an electro-magnet, and mechanism between said magnet and said carriage, whereby said magnet being energized, moves said carriage to carry the electrode thereon into contact with the other of said bodies.

10. An electric welding machine, a sliding carriage, a carrier pivoted thereon, a plurality of electrodes of like polarity on said carrier, a plurality of fixed electrodes of like polarity, means for holding the bodies to be welded between said carrier electrodes and said fixed electrodes, and means for moving said carrier to establish welding current through said bodies.

11. An electrical welding apparatus, comprising two pairs of electrodes, means for holding bodies having a plurality of joints to be welded, means for causing coöperation between the members of one pair of said electrodes to form one of said joints, and means governed by said last-named means for causing coöperation between the members of the other pair of said electrodes to form another of said joints.

12. An electric welding machine, comprising means for holding bodies having a plurality of joints to be welded, an electro-magnet for establishing welding current through one of said joints, an electro-magnet for establishing welding current through another of said joints, and means for successively energizing said magnets.

13. An electric welding machine, comprising means for holding bodies having a plurality of joints to be welded, an electro-magnet for establishing welding current through one of said joints, an electro-magnet for establishing welding current through another of said joints, and means controlled by the first of said magnets for energizing said second magnet.

14. An electric welding machine, comprising means for holding bodies having a plurality of joints to be welded, an electro-magnet for establishing welding current through one of said joints, an electro-magnet for establishing welding current through another of said joints, means controlled by said magnets for subjecting said joints to pressure, and means for successively energizing said magnets.

15. An electric welding machine, comprising two clamping electrodes receiving between them the bodies to be welded, means for controlling the clamping of said bodies in said electrodes, an electro-magnet actuating said clamp controlling means, and means controlled by said magnet for establishing alternating current circuit at the welding joint.

16. An electric welding machine, comprising two clamping electrodes receiving between them the bodies to be welded, means for controlling the clamping of said bodies in said electrodes, an electro-magnet actuating said clamp controlling means, and means controlled by said magnet for establishing alternating current circuit at the welding joint and for determining the duration of said welding current.

17. An electric welding machine, comprising welding electrodes, an electro-magnet for moving the bodies to be welded into circuit with said electrodes, and means controlled by said magnet for establishing alternating current circuit at the welding joint.

18. An electric welding machine, comprising welding electrodes, an electro-magnet for moving the bodies to be welded into circuit with said electrodes, and means controlled by said magnet for establishing alternating current circuit at the welding joint and for determining the duration of said welding current.

19. An electric welding machine, comprising a plurality of movable electrodes of like polarity and a plurality of fixed electrodes of like polarity, means for holding the bodies to be welded between said movable and fixed electrodes, and means for moving said movable electrodes to establish welding current through said bodies.

20. An electrical welding machine, comprising means for holding a plate, a bar, and a circular flange on said bar, comprising two pairs of electrodes, the said flange being received between said pairs, and the members of each pair being disposed on opposite sides of the longitudinal central axis of said bar.

21. An electric welding machine, comprising means for holding a wheel spoke and a rim in welding position, an electrode for supporting said spoke, and a movable electrode for pressing said rim against the end of said spoke.

22. A machine for electrically welding a wheel spoke and a rim, comprising means for supporting said rim and spoke in welding position, an electrode in contact with said spoke, an electrode in proximity to said rim, and means for pressing said last-named electrode against said rim to force the same into contact with said spoke.

23. An electric welding machine, comprising means for rotatably supporting a wheel having a hub, spokes and a rim, the said rim being in contact with said spokes, and means for electrically welding said rim to each of said spokes in turn as said wheel is rotated.

24. An electric welding machine, comprising means for rotatably supporting a wheel having a hub, spokes, a rim and ferrules on said spokes, and means for electrically welding said ferrules to said spokes successively as said wheel is rotated.

25. An electric welding machine, comprising a pair of electrodes, a presser block, the said presser block and pair of electrodes receiving the bodies to be welded between them, and an electro-magnet for actuating said presser block to force said bodies into mutual contact and against said electrodes.

26. An electric welding machine, comprising a pair of electrodes, a presser block, the said presser block and pair of electrodes receiving the bodies to be welded between them, an electro-magnet for actuating said presser block to force said bodies into mutual contact and against said electrodes, and means controlled by said magnet for establishing welding current through the joint.

27. An electric welding machine, comprising a pair of electrodes, a presser block, the said presser block and pair of electrodes receiving the bodies to be welded between them, a sliding rod carrying said presser block, an electro-magnet, a movable core in said magnet, and a toggle mechanism connected to said rod and said core, whereby said bodies are forced into mutual contact and against said electrodes.

28. An electric welding machine, comprising a pair of electrodes receiving the bodies to be welded between them, a sliding carriage supporting one of said electrodes, an electro-magnet, a movable core in said magnet, and a toggle mechanism connected to said carriage and said core, whereby said bodies are forced into contact.

29. An electric welding machine, comprising a pair of electrodes receiving the bodies to be welded between them, a sliding carriage supporting one of said electrodes, an electro-magnet, a movable core in said magnet, a toggle mechanism connected to said carriage and said core, whereby said bodies are forced into contact, and means controlled by said magnet for establishing welding current through the joint.

30. An electric welding machine, comprising electrodes coöperating with the bodies to be welded, means for pressing said electrodes and said bodies together, an electro-magnet actuating said pressing means, and means for magnetically varying the traction of said magnet.

31. An electric welding machine, comprising electrodes coöperating with the bodies to be welded, an electro-magnet for moving one of said electrodes into welding contact, and means for varying the reluctance in the magnetic circuit of said magnet.

32. An electric welding machine, comprising electrodes coöperating with the bodies to be welded, an electro-magnet for moving one of said electrodes into welding contact, and means for magnetically varying the traction of said magnet.

33. An electric welding machine, comprising electrodes coöperating with the bodies to be welded, an electro-magnet for moving one of said electrodes into welding contact, a plunger core in said magnet, a toggle mechanism connected to said electrode and said plunger core, and an adjustable auxiliary core in said magnet.

34. An electric welding machine, comprising means for holding bodies having a plurality of joints to be welded, electrically operating mechanism for establishing welding current at one of said joints, automatic means for retracting and cutting out said mechanism when said joint is welded, electrically actuated mechanism automatically operating upon the completion of said joint for establishing welding current at another of said joints, automatic means for retracting and cutting out said second-named welding mechanism when said second joint is welded, and a single switch controlling all of said electrically operated mechanisms.

35. An electric welding machine, comprising a transformer, said transformer comprising a secondary having a middle member and two side members, said side members being electrically connected to said middle member at corresponding extremities, an electrode connected to said middle member, a coöperating electrode connected to said side members, and means for supporting the bodies to be welded by said electrodes.

36. An electric welding machine, comprising a transformer, said transformer comprising a secondary having a middle member and two side members, said side members being electrically connected to said middle member at corresponding extremities, an electrode supported on said middle member, a coöperating electrode supported by said side members, and means for holding the bodies to be welded by said electrodes.

37. An electric welding machine, comprising a transformer, said transformer comprising a secondary having a middle member and two side members, said side members being electrically connected to said middle member at corresponding extremities, an electrode resiliently supported on said middle member, a coöperating electrode supported by said side members, and means for holding the bodies to be welded by said electrodes.

38. An electric welding machine, comprising a transformer, said transformer comprising a secondary having a middle member and two side members, said side members being electrically connected to said middle member at corresponding extremities, a laminated brush having its ends bearing on said middle member, an electrode supported on said brush, a coöperating electrode supported by said side members, and means for holding the bodies to be welded by said electrodes.

39. An electric welding machine, comprising a transformer, said transformer comprising a secondary having a middle member and two side members, said side members being electrically connected to said middle member at corresponding extremities, an electrode supported on said middle member, a frame carried by said side members of said secondary, a support on said frame, a carriage on said support, an electrode on said carriage, and means for holding the bodies to be welded by said electrodes; the said carriage being movable on said support to move its electrode into coöperation with said first-named electrode.

40. An electric welding machine, comprising a transformer, said transformer comprising a secondary having a middle member and two side members, an annular core in the space surrounding said middle member and between said middle member and said side members, a primary on said core, an electrode supported on said middle secondary member, a coöperating electrode supported by said side secondary members, and means for holding the bodies to be welded by said electrodes.

41. An electrical welding apparatus, comprising a master switch, a relay operated thereby, coöperating electrodes, and means controlled by said relay for moving said electrodes into coöperation and pressing the same together, and for establishing welding current to said electrodes.

42. An electrical welding apparatus, comprising a master switch, a relay operated thereby, coöperating electrodes, means controlled by said relay for moving said electrodes into coöperation and pressing the same together, and for establishing welding current to said electrodes, and means actuated by said welding current for cutting off the same after a predetermined period of flow.

43. An electrical welding apparatus, comprising a master switch, a relay operated thereby, coöperating electrodes, means controlled by said relay for moving said electrodes into coöperation and pressing the same together, and for establishing welding current to said electrodes, means actuated by said welding current for cutting off the same after a predetermined flow, and means for retracting said electrodes.

44. An electrical welding apparatus, comprising a master switch, a relay operated thereby, coöperating electrodes, means controlled by said relay for moving said electrodes into coöperation and pressing the same together, and a relay controlled by said moving means for establishing welding current to said electrodes.

45. An electric welding apparatus, comprising a presser device for the welding joint, the said presser device comprising a sliding rod movable into contact with the objects to be welded, a toggle arm pivoted to a fixed support, a toggle arm pivoted to said rod, the said toggle arms being pivoted together at their free ends, a link pivoted at one end to said arms, a bell crank lever pivoted to the opposite end of said link, an electro-magnet, and an armature for said magnet pivoted to said bell crank lever.

In testimony whereof we have affixed our signatures in presence of two witnesses.

THOMAS E. MURRAY.
HARRY R. WOODROW.

Witnesses:
GERTRUDE T. PORTER,
MAY T. McLARRY.